March 14, 1967     D. PHILLIPS     3,309,119

BOLT BLOCK FOR FASTENING EXPANDED METAL

Filed June 23, 1964

INVENTOR
DAVID PHILLIPS

BY *Claude Funkhouser*
ATTORNEY

United States Patent Office 3,309,119
Patented Mar. 14, 1967

3,309,119
BOLT BLOCK FOR FASTENING EXPANDED METAL
David Phillips, Dahlgren, Va., assignor to the United States of America as represented by the Secretary of the Navy
Filed June 23, 1964, Ser. No. 377,428
2 Claims. (Cl. 287—189.35)

The invention described herein may be manufactured and used by or for the Government of the United States of America for governmental purposes without the payment of any royalties thereon or therefor.

The present invention relates generally to improvements in structural units, and more particularly to a new and improved fastening means for plate type expanded metal.

The term "expanded metal" as utilized herein refers to the product which results from the piercing and stretching of a metal sheet or plate, whereby the pierced slots expand upon stretching to form the apertures of a screen or grid-like structure.

In the fastening of expanded metal to structural supports it has been the practice to sandwich a portion of the expanded metal plate between a retainer and the structural support. Typical of such techniques is the use of an angle iron which overlaps the edge of the expanded metal plate and which is bolted or otherwise secured to the support, or alternatively to bolt the expanded metal to the support by placing a washer, which bridges across one of the apertures of the expanded metal, under a nut or bolt head.

Although such techniques of fastening have served the purpose, they have not proven entirely satisfactory in all applications, particularly where the expanded metal is used as a walkway. In such a situation, it is desirable to have a completely flush installation, so that there will be no hazard to safety in the form of an obstruction above the surface of the expanded metal plate. It is also desirable to retain the removable feature of the above described techniques, so that sections of the walkway may be removed to provide access to machinery, plumbing, or wiring which may lie below.

It is an object of this invention to provide an expanded metal assembly which can be securely fastened to a variety of supporting structures.

It is a further object of this invention to provide an expanded metal assembly which may be removably secured to a supporting member, and which will present no projections which extend above the surface of the expanded metal.

Various other objects and advantages will appear from the following description of the several embodiments of the invention illustrated in the accompanying drawings, in which.

Figure 1:
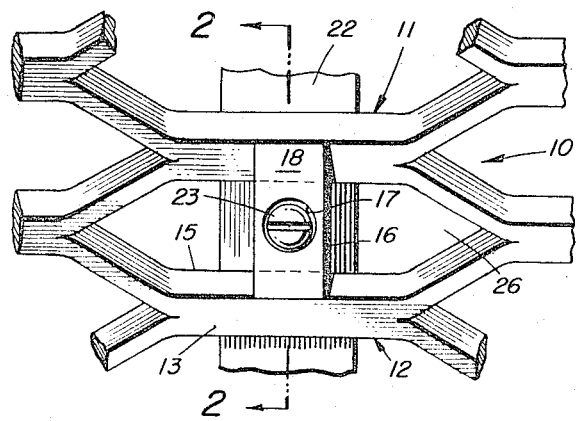
FIG. 1 shows a plan view of a portion of an expanded metal plate with the retaining block inserted into one of the expanded metal apertures.

Referring now to the drawings, wherein like reference numerals designate like or corresponding parts throughout the several views, it will be seen that the type of expanded metal plate 10 with which this invention is concerned is characterized by ribs 11 and 12 which are inclined to the plane 27 of the expanded metal plate. Ribs 11 and 12 define an aperture 26 in the expanded metal plate, which aperture is representative of a plurality of substantially uniform apertures which are spaced throughout the plate surface.

A retaining block 16 is shown inserted into aperture 26 of the plate. The uniformity in both size and shape of the apertures permits the retaining block 16 to be seatable in any one of the apertures. The retaining block shown in the illustrated embodiments is substantially a rhomboid in cross-section, with the addition of a triangular projection formed by an extension of the upper surface 18 and an additional face 21.

Figure 2A:
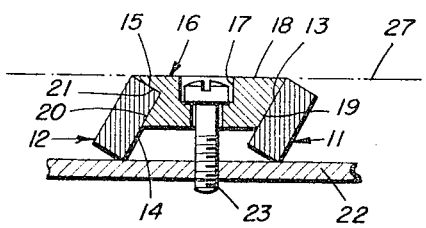
FIG. 2A is a sectional view taken along the line 2—2 of FIG. 1, and additionally illustrating the plate fastened to a supporting member.

Referring in particular to FIG. 2A, block 16 is shaped so that faces 19, 20, and 21 will be substantially parallel with faces 13, 14, and 15, respectively, of the expanded metal plate 10. In the illustrated embodiments, block 16 is shaped for use with expanded metal ribs which are rectangular in cross-section. Other cross-sectionally shaped grids would require a corresponding change in the block shape. This parallel relationship permits the block 16 to seat in the plate aperture 26 in surface to surface relationship, rather than in the line to line relationship which would result from the prior art fastening techniques of bridging across the top surface 27 of the plate 10 with a washer or angle iron. The surface to surface relationship facilitates a uniform distribution of the bearing load between the block 16 and the plate 10, which load results from the torque applied to the fastener. By uniformly distributing the bearing load, deformation of the retainer and/or plate is reduced, as is the tendency of the assembly to loosen.

By virtue of the unique cross-sectional shape of the block, the block also locks into place against the ribs 11 and 12, thereby restricting not only vertical movement of the plate 10 but also horizontal sliding movement relative to the support member 22. Although surface 20 of block 16 is not a bearing surface when the block is secured in place, it serves to stabilize the block in position prior to and during the fastening operation by preventing the block from sliding down surface 13 and up surface 15. Surface 20 also serves to prevent the block from rotating about the axis of the screw or bolt during the tightening operation.

Upper surface 18 of block 16 lies substantially flush with the plane 27 of the upper surface of plate 10, so as to offer no projecting obstruction. The flush configuration also provides an installation neater in appearance than that which results from the projecting retainers employed by the prior art. Surface 18 may lie below plane 27, providing that sufficient bearing surface 21 is retained, and further providing that the triangular projection defined by surfaces 18 and 21 has sufficient depth to prevent its being deflected or sheared off when the fastener is tightened in placed.

FIG. 2A illustrates one means of securing retaining block 16 and plate 10 to the support member 22. Block 16 is provided with a counterbored hole 17 to receive screw 23, which in turn may be threaded into support member 22. The counterbore hole 17 permits the head of screw 23 to lie below the surface 27 of plate 10.

Figure 2B:
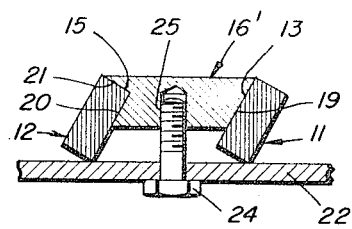
FIG. 2B is a sectional view corresponding to FIG. 2A illustrating an alternative fastening arrangement.

An alternative arrangement for securing the novel retaining block of this invention is illustrated in FIG. 2B, wherein block 16' is fastened to member 22 by means of a bolt 24 which is received in a threaded hole 25 in the lower portion of block 16.

Figure 2C:
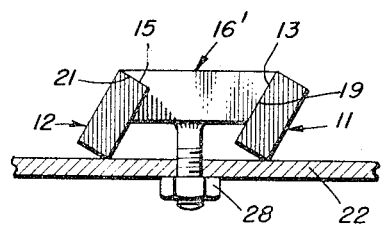
FIG. 2C is a sectional view corresponding to FIG. 2A illustrating a further alternative fastening arrangement.

FIG. 2C illustrates a third fastening arrangement wherein block 16' actually forms the head of a bolt. The bolt is held in place by means of a nut 28.

The preferred method of fabricating the retaining block of FIGS. 2A and 2B is by the extrusion process, although such operations as shaping or milling might also be employed. A forging operation is deemed to be desirable for the retaining block illustrated in FIG. 2C.

It is to be understood that the foregoing disclosure relates only to preferred embodiments of the invention and that numerous modifications may be made therein without departing from the spirit and scope of the invention as set forth in the appended claims.

Having thus described the invention, what is claimed and desired to be secured by Letters Patent of the United States is:

1. Fastening means for removably securing an expanded metal plate to a support member, which plate is characterized by grid elements inclined to the plane of the plate and which grid elements define substantially uniform apertures in the plate, comprising:

a retaining block having a cross-sectional shape defined by extending the upper surface of a rhomboid beyond the obtuse vertex of said upper surface to form the hypotenuse of a right triangular projection, said block being insertable into an aperture of the plate defined by the grid elements thereof;

whereby when said retaining block is inserted into an aperture of the plate and seated therein, it abuts the grid element portions of the plate which define the extremities of such aperture in substantially surface to surface relationship, and said retaining block upper surface lies substantially flush with the plate upper surface.

2. In a building structure, the combination which comprises:

an expanded metal plate characterized by grid elements inclined at an oblique angle to the plane of said plate, said grid elements defining substantially uniform apertures in said plate;

a retaining block having an upper surface and first and second end surfaces adjacent said upper surface and inclined at an oblique angle thereto, said first and second end surfaces being mutually perpendicular;

whereby when said retaining block is inserted into an aperture of said plate, said first and second end surfaces abut said plate grid elements which define such aperture in substantially surface to surface relationship, and said retaining block upper surface lies substantially flush with said plate upper surface.

References Cited by the Examiner

UNITED STATES PATENTS 2,208,094    7/1940    Crandell    52—346
3,185,269    5/1965    Nagin    52—507 X

OTHER REFERENCES

Safety Grip-Strut publication; Globe Co., Chicago, Ill., May 8, 1957; page 5 relied upon.

HARRISON R. MOSELEY, *Primary Examiner.*

J. K. BELL, *Assistant Examiner.*